United States Patent [19]

Lagadec et al.

[11] Patent Number: 4,672,527
[45] Date of Patent: Jun. 9, 1987

[54] METHOD AND APPARATUS FOR SUPPLYING A SYSTEM FOR PROCESSING ELECTRICAL SIGNALS

[75] Inventors: Roger Lagadec, Rumland, Switzerland; Robert Muller, Nashville, Tenn.

[73] Assignee: Willi Studer AG, Regensdorf, Switzerland

[21] Appl. No.: 678,791

[22] Filed: Dec. 6, 1984

[30] Foreign Application Priority Data

Dec. 8, 1983 [CH] Switzerland ................ 566/83

[51] Int. Cl.$^4$ ............................................ H02P 13/26
[52] U.S. Cl. ...................................... 363/89; 363/65; 323/266; 323/272
[58] Field of Search .................. 363/65, 70–71, 363/86, 89; 323/266, 271, 272

[56] References Cited

U.S. PATENT DOCUMENTS

| | | | |
|---|---|---|---|
| 3,967,181 | 6/1976 | Chambers et al. | 323/266 X |
| 4,079,418 | 3/1978 | Kupka et al. | 358/149 |
| 4,314,323 | 2/1982 | Conti et al. | 363/71 |

Primary Examiner—Peter S. Wong
Attorney, Agent, or Firm—Helfgott & Karas

[57] ABSTRACT

In a circuit supplying a digital system, the frequency at which the switching device therein is controlled is synchronized to be the same as one or several times half the sampling frequency. In this way, the original frequency spectrum can be kept free from interfering signals.

17 Claims, 7 Drawing Figures

METHOD AND APPARATUS FOR SUPPLYING A SYSTEM FOR PROCESSING ELECTRICAL SIGNALS

FIELD OF THE INVENTION

The present invention relates to method and apparatus for supplying power at a predetermined level to a system for processing electrical signals obtained from a main signal by sampling at a particular frequency and including a switching device for producing stable frequency electrical pulses.

BACKGROUND OF THE INVENTION

Switching networks operating with a constant switching frequency and using pulse width modulation are per se known. Such known systems are used for supplying electronic systems with direct current or direct voltage. These prior art switching networks are operated at the frequency of their own internal oscillator.

The aforementioned systems include inter alia digitally operating audio systems, in which the information signal is sampled at a frequency fs and in which the resulting pulse-like signals are then processed. Since the oscillator frequency fo in the supplying network is different from the sampling frequency fs, it is not possible to avoid undesired signals, such as e.g. interference in such systems which have a strong spectral component at the sampling frequency fs and a strong component at the oscillator frequency fo. Such signals can occur as digital signals or as signals sampled with the sampling frequency fs.

More particularly, such interference often occurs in analog - digital converters. The new signals resulting from the interference can be in the audible range of the human ear and the frequency of such interference signals within the audible frequency range can change. More particularly, this occurs if the oscillator frequency fo is not absolutely constant in the switching network. For example, such frequency changes occur in the case of varying loads on the oscillator in the power supply.

SUMMARY OF THE INVENTION

The problem to which the present invention is directed is to provide an apparatus for supplying digitally operating systems so that the spectrum of the original signal is free from the aforementioned interfering signals.

The invention is based on synchronization between the sampling frequency and the switching frequency of the switching device to thereby avoid interference between them. Hitherto, interference was possible between a signal frequency, the sampling frequency, the corresponding Nyquist frequency and the switching frequency. Due to the fact that the switching frequency coincides with the Nyquist frequency or the sampling frequency, certain interference formation possibilities are eliminated. Thus, in the case of digital audio systems, it is possible using the invention to avoid fixed interfering frequencies in the audible range.

BRIEF DESCRIPTION OF THE DRAWINGS

The invention is described in greater detail hereinafter relative to non-limitatve embodiments and the attached drawings, wherein.

DETAILED DESCRIPTION OF THE PREFERRED EMBODIMENTS

Figure 1:
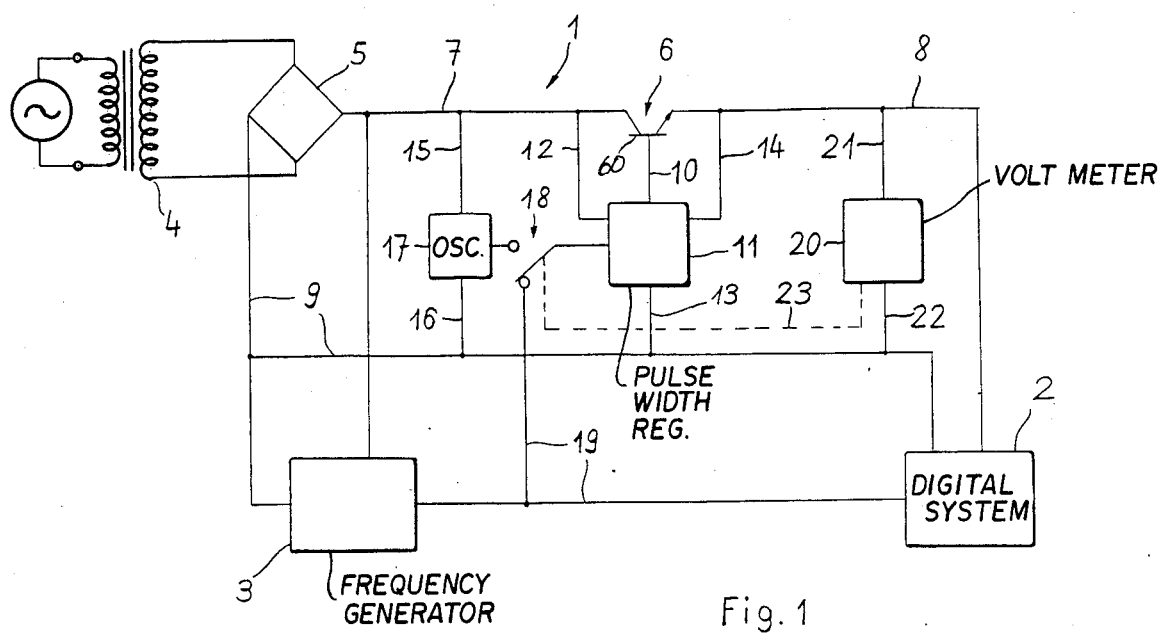
FIG. 1 is a circuit diagram of a first embodiment of the present apparatus.

FIG. 1 shows an apparatus for supplying a system 2, which is used for processing signals resulting from the sampling of an input or information signal with a given frequency fs. System 2 can e.g. be digital audio systems for recording or reproducing sound signals or individual devices for such systems, in which sampling values or signals are to be processed. System 2 can have its own integrated sampling frequency generator or the sampling frequency can be supplied to system 2 from an external source. For example, the sampling frequency fs can emanate from a sampling frequency generator 3, which can synchronize system 2 and the present apparatus with half the sampling frequency fs/2 or with a multiple of one or more times half the sampling frequency fs/2.

The circuit 1 shown in FIG. 1 contains a transformer 4. A rectifier bridge 5 and a switching device 6 are connected to the secondary winding of transformer 4. In the represented embodiment, the switching device 6 comprises a transistor 60. However, several transistors can also be used in such a switching device. All of the various means able to perform the same function are covered by the term "switching device".

A line 7 connects the rectifier bridge 5 to the switching device 6, while another line 8 connects the switching device 6 to system 2. A third line 9 connects the second pole of the rectifier bridge 5 to system 2. Switching device 6 has a control input 10, which is located on the base of transistor 60 and is connected to a pulse width regulator 11. Lines 12 and 13 are used for supplying the pulse width regulator 11. A line 14 is used to indicate the output voltage-to-current ratios in line 8 to the pulse width regulator 11.

An oscillator 17 is connected between lines 7 and 9 by lines 15 and 16 respectively. The output terminal of oscillator 17 is connected to one of the poles of a reversing switch 18, which is connected to the pulse width regulator 11. The other pole of the reversing switch 18 is connected to a line 19, which connects the sampling frequency generator 3 to system 2.

A voltmeter 20 is connected to lines 8 and 9 by lines 21 and 22 respectively. A further line 23 connects the latter with the reversing switch 18 and is used for the transmission of switching instructions.

"Switch" 18 can be a relay with the signals on line 23 operating the coil thereof. This function could also be performed using a device such as a solid state controlled switching device, such as an FET switch, and for this reason line 23 is shown dashed. All such means are intended to be covered by the terms "switch", "switching device" and the like as used herein.

Figure 2:
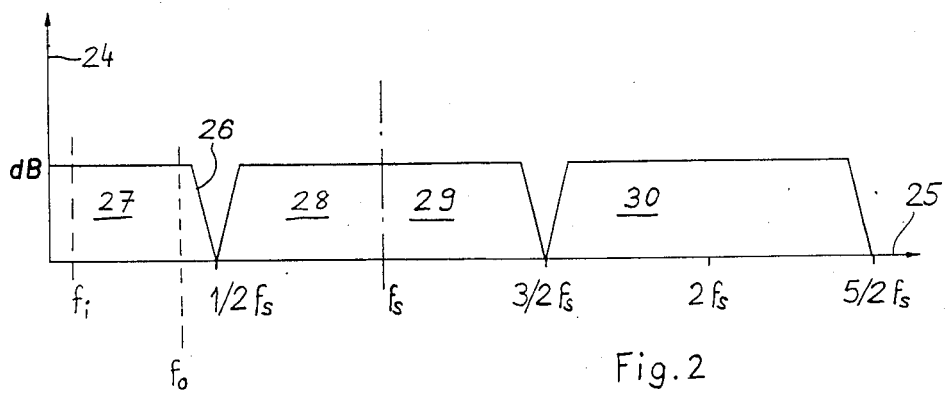
FIG. 2 is the frequency response of an audio system.

FIG. 2 shows the possible frequency response of a system 2 connected to the apparatus. In FIG. 2 the amplitude is given in dB on the vertical axis 24 and the frequency is on the horizontal axis 25. The operating range of system 2 is below half the sampling frequency fs/2. Signals with higher frequencies than fs/2 are filtered out by filters not shown in a per se known manner. A transition region between permitted signals and undesired signals is indicated in simplified form by line 26. According to the Shannon sampling theorum, the original spectrum 27 appears as a convolution 28, 29 and 30 around the sampling frequency fs.

A main function of the circuit 1 of the present invention is to supply system 2 with a given power level at a specific and as far as possible constant voltage across lines 8 and 9. Generally, this power is taken from an alternating current network on the primary coil of transformer 4. The secondary winding of transformer 4 takes this power from the network and carries it into the rectifier bridge 5 which supplies direct current to lines 7 and 9. In order to be able to adapt the supplied power to the characteristics of system 2, the switching device 6 interrupts the connection between lines 7 and 8 in a periodic manner. The current pulses occurring in line 8 are smoothed in a per se known manner by means not shown. Although said current pulses always have the same voltage, they do not have the same pulse duration and/or width. In per se known manner, the pulse width is modified by pulse width generator 11. Such pulses then control the switching device 6 correspondingly. The frequency at which the switching device 6 is controlled is constant and is normally determined by the oscillator 17, when the reversing switch 18 is in the corresponding position, opposite that shown in FIG. 1.

In sensitive systems 2, in part dominant signals appear, which on the one hand have the sampling frequency fs and which on the other hand have the oscillator frequency fo. These signals interfere with one another, so that in certain circumstances further signals occur at frequencies fi, whose frequency can be relatively low. The formula for the resultant interference frequencies is:

$$fi = ((m \cdot fs/2) + (n \cdot fo/2)) \text{ modulo } fs/2$$

in which m and n can be random positive or negative integers. The modulo fs/2 operation indicates that the positive or negative frequencies resulting from the use of m and n are convoluted back into the base band fs/2, as is known in sampling systems. If fs=48 kHz and fo=20 kHz, then e.g. a frequency fi=4 kHz is obtained with m=+1 and n=−2 in the formula. If system 2 is e.g. an audio system, then signals with frequency fi can be easily heard.

When reversing switch 18 is connected to the sampling frequency generator 3 in the manner shown in FIG. 1, then the pulse frequency of pulse width regulator 11 and consequently also the switching device 6 is determined by the sampling frequency fs. Sampling frequency fs reaches the pulse width regulator 11 either from sampling frequency generator 3 or from system 2 if no separate sampling frequency generator 3 is provided.

Figure 6:
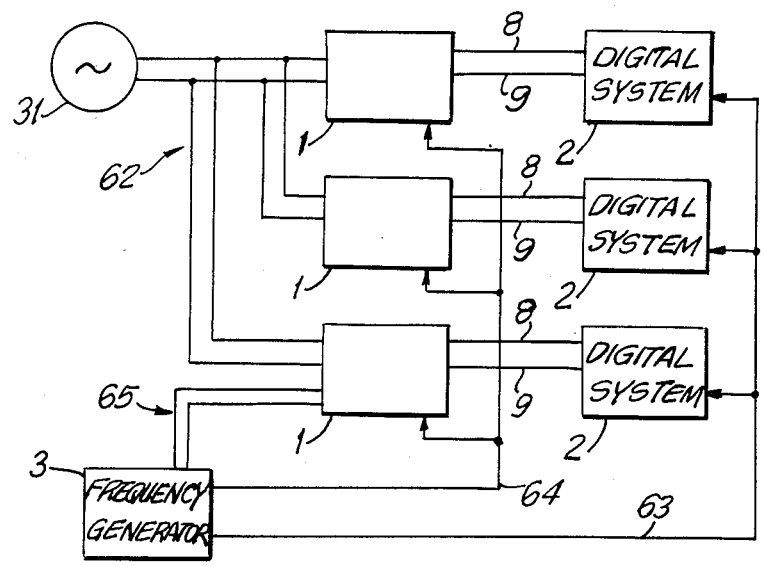
FIG. 6 shows a "ganged" arrangement according to the invention.

Voltmeter 20 monitors the voltage in lines 8 and 9. If the voltage between lines 8 and 9 exceeds the desired value, then voltmeter 20 supplies a switching instruction to the reversing switch 18 on line 23. As a result of this switching instruction, switching device 6 is again connected to oscillator 17 with frequency fo. This occurs mainly during switching processes on and off, as well as in the event of a fault in the power supply.

Where several circuits 1 are provided in one apparatus for one or more systems 2 as shown in FIG. 6, it is advantageous to synchronize their switching devices 6 to the same sampling frequency. This can be done by providing a common sampling frequency generator 3 for all of the circuits 1, in such a "ganged" system, as shown in FIG. 6. FIG. 6 shows, for example, a common voltage source 31 connected through lines 62 to each one of three circuits 1. Three systems 2 are connected to the circuits 1 through lines 8 and 9. A common sampling frequency generator 3, shown here as a separate element, may also be part of one of the systems 2. The sampling frequency generator 3 is connected through lines 63 to all systems 2 for synchronizing them to the sampling frequency, but it is also connected through a line 64 to the circuits 1 in order to transmit the sampling frequency to each of those circuits 1. The sampling frequency generator 3 may also be connected through lines 65 to a power supply such as for example one of the circuits 1.

Figure 7:
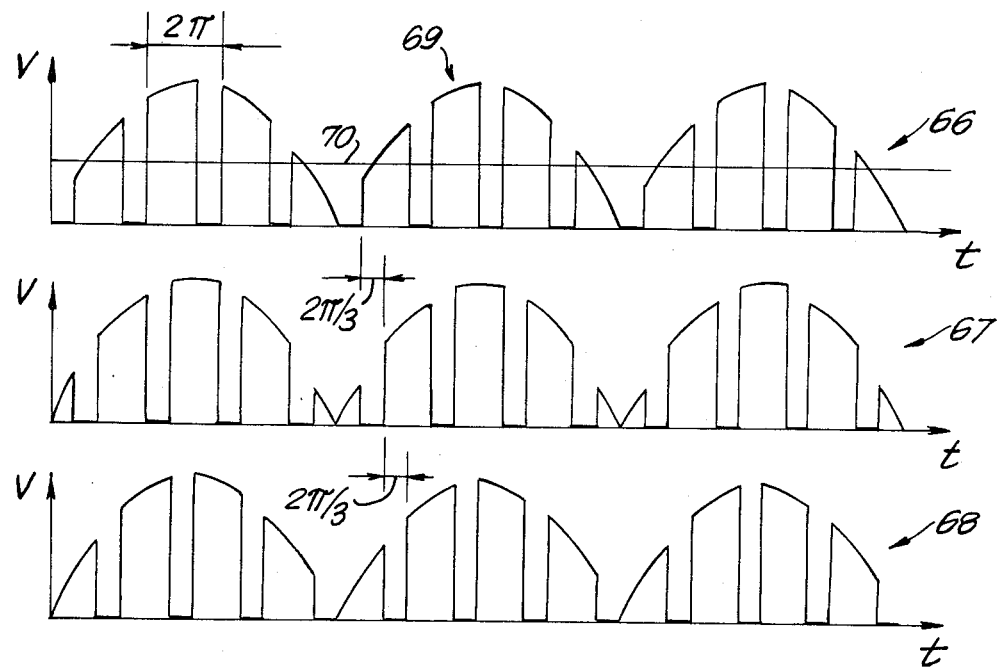
FIG. 7 shows a group of curves showing phase displacement occurring in the circuit of FIG. 6.

It can be advantageous for the different circuits 1 to operate against one another with a phase displacement. In the case of a number of circuits 1, the phase displacement between the individual circuits can be 2pi/n, where n indicates the number of circuits 1 involved. This is shown in FIG. 7 where pulses 69 of signals 66, 67 and 68 each corresponding to signals transmitted by line 8 of a circuit 1 are phase displaced by a factor amounting to 2pi/3. The voltage of the subsequently smoothed signal is indicated by a line 70. This has an advantage that the primary side loading of transformer 4 is more uniform.

For supplying a system 2 with direct current the present apparatus can also be constructed in such a way that the frequency of the alternating current from which direct current is obtained is one or several times half of the sampling frequency fs. A corresponding circuit arrangement is shown is FIG. 3.

Figure 3:
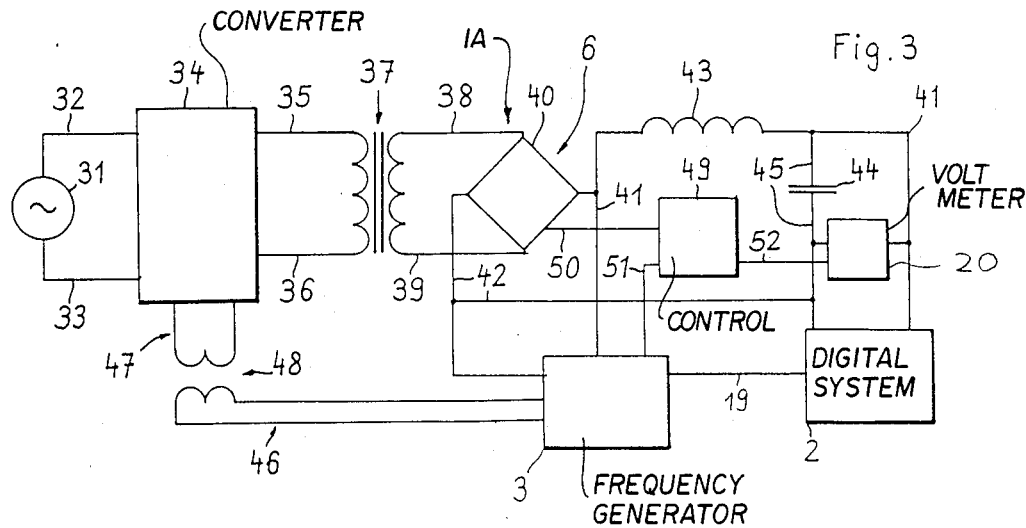
FIG. 3 shows a second embodiment of the present apparatus.

The circuit 1a shown in FIG. 3 is supplied with power from an a.c. voltage, e.g. mains voltage source 31. Parts in FIG. 3 the same as or similar to parts shown in FIG. 1 are indicated by the same reference numeral or the same reference numeral followed by "a", respectively. The voltage is supplied via lines 32, 33 to a per se known converter 34, which converts the voltage supplied into an a.c. voltage with a frequency which is a multiple of one or several times half of the sampling frequency fs. Lines 35, 36 connect the output of converter 34 to a transformer 37, which is series-connected to a controllable rectifier 40 which acts like the aforementioned switching device 6 across lines 38, 39. Rectifier 40 is preferably constructed as a FET-bridge.

The embodiment of FIG. 3 operates on fs, or fs/2 or an integer multiple of it. The converter 34 and the rectifier 40 also operate on said frequency. Otherwise, interferences between the frequency on which the converter 34 and the rectifier 40 operate and the frequency of the system 2 (that is the sampling frequency) would be possible and the resulting signals could disturb the sampled signals within the system 2.

Rectifier 40 is connected across further lines 41, 42 to system 2 and to the sampling frequency generator 3. An inductor 43 is connected in line 41 which, together with a capacitor 44 which is connected across a line 45 between lines 41 and 42, forms a means for smoothing the current pulses. The sampling frequency generator 3 is connected via lines 46, 47 and a transmitter 48 is connected to converter 34. The voltmeter 20 is placed across lines 41 and 42/45. A control unit 49 is connected by means of lines 50, 51 and 52 to rectifier 40, sampling frequency generator 3 and voltmeter 20. Line 19 connects the sampling frequency generator 3 to system 2, as in FIG. 1.

The transmitter 47 and the transformer 37 also serve to separate or electrically isolate the signal handling parts of the circuit from the source voltage 31.

It is assumed that the voltage source 31 supplies a sinusoidal voltage (FIG. 4), e.g. a mains voltage, which is converted in converter 34 to a higher frequency sinusoidal voltage 53. Voltage 53 is supplied across transformer 37 to the controllable rectifier 40, which produces from said voltage 53 a rectified voltage 53, 54. This takes place at times indicated by arrows 55. In this case and at such time, system 2 is supplied with maximum power.

For the control of circuit 1a, on the one hand converter 34 receives a timing signal from sampling frequency generator 3 via lines 46, 47 and transmitter 48, and on the other hand rectifier 40 receives the same timing signal or a corresponding frequency-divided (with integral parts) timing signal on line 50 from control 49. For this purpose, control unit 49 is controlled with the timing signal via line 51.

However, if system 2 receives too much power in this way, then this is detected by voltmeter 20 in the form of an excessively high voltage on lines 41, 42 and/or 45 and said voltmeter supplies a control signal to control unit 49 via line 52. Control unit 49 converts the control signal for rectifier 40 which had been supplied at regular intervals in accordance with arrows 55, in such a way that new control signals appear at times indicated by arrows 56 and 57. The distance between two adjacent arrows 56 or two adjacent arrows 57 corresponds to the time spacing of one period or cycle , as with arrows 55. However, now the period is displaced by one spacing a and is subdivided into spacings a plus b plus a.

Figure 4:
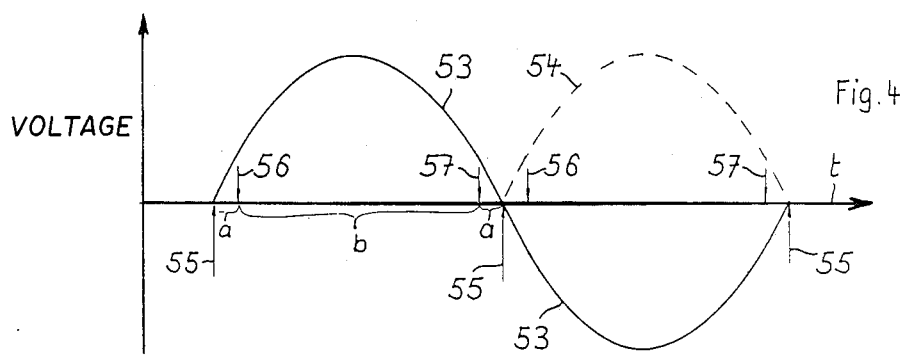
FIGS. 4 and 5 are representations of the voltages processed by the apparatus according to FIG. 3.
Figure 5:
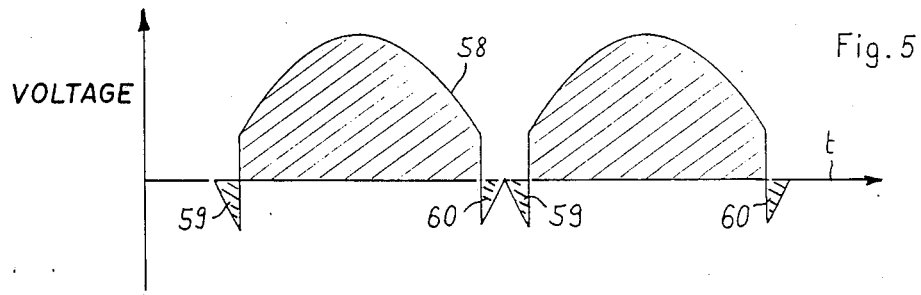

This means that rectifier 40, instead of switching over at times corresponding to arrows 55, now switches over at times corresponding to arrows 56 and then earlier at the times corresponding to arrows 57. This gives a voltage gradient 58 as shown in FIG. 5. The sum of the regions between voltage gradient 58 and the time axis t gives the new power. Particularly due to the negative power fractions indicated by regions 59, 60, said power is smaller than that corresponding to those regions defined by time axis t and voltage curves 53, 54 in FIG. 4.

If the power level is to be further reduced the spacing a must be increased. This is determined in control unit 49, which e.g. contains a read-only memory, which stores switchover times for rectifier 40 at given voltages which then act as memory addresses.

The constant voltage to be kept on the lines 8 and 9 corresponds to a precise value for the spacing a. If the voltage measured by the voltmeter 20 is slightly greater, then the control unit 49 will cause the spacing a to increase. This also means that the power delivered to the system 2 increases. If the voltage measured by the voltmeter 20 is slightly smaller than the value to be kept, then the control unit will cause the spacing a to decrease. Accordingly, the power will then increase. Therefore, the spacing b will decrease or increase accordingly.

It should be clear that also in the case of the embodiment of FIG. 3 of the present apparatus, the sampling frequency generator 3 can be part of the system or can be omitted because the actual system supplies the sampling frequencies.

In the embodiments shown and described, the systems 2 need a constant voltage, e.g. 5 V. The system 2 needs some power, but this need may not be constant. As the power equals the product of voltage and current, to adapt the power in the system 2 the invention operates by adapting the current. This adaptation of the current to the power needed is done by the switch 6. The switch 6 releases bursts of direct current (as pulses 69, FIG. 7, or pulses 58, FIG. 5) whose length within the period 2pi is calculated from the sampling frequency fs, as is well known, 1/fs. Therefore, the leading edge of such a pulse is produced at the sampling frequency and is synchronized with it. The trailing edge defines the length of the pulse and is therefore produced at varying time intervals following the leading edge in the case of the embodiment according to FIG. 1. With respect to the embodiment of FIGS. 3 to 5, the switching times are as indicated by the arrows 55, 56 and 57 and are tied to the sampling frequency and therefore no interferences will be possible, i.e., switching according to the arrows 55 is produced at the sampling frequency (FIG. 4).

Voltage has nothing to do with dB in the invention. There is no relation between FIG. 5 and dB. dB's are only mentioned in FIG. 2 when discussing the spectrum of the frequencies occurring in a system 2, when system 2 is a digital audio system. Then the output of such a system is measured in dB, but this has no direct relation with the power supply of such a system except that the power supply of a system 2 having an enormous output in dB will have a power supply capable of supplying enough power to make such an output possible.

As to the operation of switch 18 and oscillator 17, under normal conditions a precise voltage should be kept in the lines 8 and 9. This is arranged by means of controlling the switch 6 as explained by means of the pulse width regulator 11 which constantly measures the voltage in the lines 8 and 9 as indicated by the lines 14 and 13. If this voltage cannot be kept simply by adjusting the length of the pulses, then the voltage will increase or decrease and the departure from the required voltage is sensed by the voltmeter 20 and it will send out a signal through line 23 to the unit 18. The switch 18 will connect the pulse width regulator 11 to the oscillator 17. This is essentially the case when the system 2 is started or shut down or when it does not operate correctly.

In case of the embodiment according to FIG. 3 the voltage only is sensed by the voltmeter 20. Signals transmitted from the voltmeter 20 to unit 49 are used to adjust the switching times as indicated by the arrows 55 to 57. If this procedure does not succeed in keeping the voltage constant, then departure from the right voltage is transmitted to unit 49. Of course this embodiment could as well be equipped with switching means 18 and an oscillator 17 as shown in FIG. 1.

While the invention has been described in detail above, it is to be understood that this detailed description is by way of example only, and the protection granted is to be limited only within the spirit of the invention and the scope of the following claims.

We claim:

1. An apparatus for supplying power to a system for producing and processing a sampled signal resulting from the sampling of an information signal with a sampling frequency fs, comprising switch means controlling the supplying of said power to said system, and means to control said switch means to cause said switch means to operate at a frequency which is a multiple of one or more times half of the sampling frequency fs and synchronized with said sampling frequency.

2. An apparatus according to claim 1, a sampling frequency generator and means to connect said switch means to said sampling frequency generator.

3. An apparatus according to claim 2, and a pulse width regulator, means to connect said pulse width regulator to said switch means, and second switch means interposed between said means for producing and processing sampled signal and said pulse width regulator, and means to operate said second switching means in accordance with the voltage of the power supplied to said system for producing and processing a sampled signal.

4. An apparatus according to claim 3, wherein said means to operate said second switch means comprises a voltmeter, and means to connect said voltmeter in series circuit with said first mentioned switch means.

5. An apparatus according to claim 3, further comprising an oscillator, means to connect said oscillator to said second switch such that in one switching position of said second switch the pulse width regulator is connected to the oscillator and in the other switching position of said second switch means said pulse width regulator is connected to said sampling frequency generator.

6. An apparatus according to claim 5, wherein said second switch means is controlled in such a way that said first mentioned switch in synchronized with the sampling frequency fs only when the voltage of the power supplied to said system for producing and processing a sampled signal reaches a predetermned output voltage value.

7. An apparatus according to claim 1, wherein said switch means comprises a controllable rectifier.

8. An apparatus according to claim 7, wherein said controllable rectifier is implemented by one or more FET transistors.

9. An apparatus according to claim 7, said means to control said switch means comprising a control unit connected upstream of the controllable rectifier to be controllable by the sampling frequency fs and a signal proportional to the desired power.

10. An apparatus according to claim 1, wherein the multiple of one or several times half of the sampling frequency fs is an integer.

11. An apparatus according to claims 1, wherein said power is supplied to said system for producing and processing a sampled signal at a substantially constant voltage and at varying current to maintain a predetermined power level.

12. A circuit arrangement of a plurality numbering n of the apparatuses according to claim 1, and means to synchronize the operation of said switch means in all n of said apparatuses to operate at one sampling frequency.

13. The circuit arrangement according to claim 12, wherein each switching means is controlled and synchronized at a phase displace of 2pi/n relative to one another.

14. A method of supplying power at a predetermined level to a system for producing and processing a sampled signal resulting from the sampling of an information signal with a sampling frequency fs, comprising the steps of providing an alternating current, rectifying and filtering said alternating current to obtain a direct current, and interrupting said direct current periodically and subsequently disinterrupting said direct current with a frequency equal to a multiple of one or more times half of said sampling frequency fs.

15. A method according to claim 14, and the step of modulating a time difference between said interrupting and disinterrupting of said direct current as a function of the voltage of said supplied power.

16. A method of supplying power at a predetermined level to a system for producing and processing a sampled signal resulting from the sampling of an information signal with a sampling frequency fs, comprising the steps of providing an alternating current, adapting and synchronizing the frequency of said alternating current to a frequency which is a multiple of one or more times half of said sampling frequency fs, rectifying said adapted and synchronized alternating current at a frequency related to said frequency which is a multiple of one or more times half of the sampling frequency, and controlling said frequency related to said sampling frequency as a function of the voltage of said supplied power.

17. In combination:
a system for processing and/or producing signals resulting from the sampling of an information signal with a sampling frequency fs,
a sampling frequency generator,
a source for alternating current,
switch means controlling the supplying of power from said source to said system, and
means to control said switch means to cause said switch means to operate at a frequency which is a multiple of one or more times half said sampling frequency.

* * * * *